(12) United States Patent
      Cider

(10) Patent No.: US 12,612,054 B2
(45) Date of Patent: Apr. 28, 2026

(54) METHOD FOR REDUCING THE RISK OF VEHICLE TIRE RUPTURE

(71) Applicant: Volvo Truck Corporation, Gothenburg (SE)

(72) Inventor: Lennart Cider, Alingsås (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/921,095

(22) Filed: Oct. 21, 2024

(65) Prior Publication Data

US 2025/0145165 A1    May 8, 2025

(30) Foreign Application Priority Data

Nov. 6, 2023    (EP) ..................................... 23207996

(51) Int. Cl.
    *B60W 50/00*        (2006.01)
    *B60C 23/04*        (2006.01)
                (Continued)

(52) U.S. Cl.
    CPC ..... *B60W 50/0098* (2013.01); *B60C 23/0486* (2013.01); *B60C 23/20* (2013.01);
                (Continued)

(58) Field of Classification Search
    CPC .. B60W 50/0098; B60W 10/22; B60W 10/30;
            B60W 30/18; B60W 2530/20; B60W
            2710/22; B60W 2710/30; B60W 2720/10;
            B60C 23/0486; B60C 23/20; B60C 23/18;
            B60C 23/19; G07C 5/0816; B60R
                16/0231
    See application file for complete search history.

(56) References Cited

U.S. PATENT DOCUMENTS 10,675,925 B1    6/2020   Oakes, III et al.
2012/0116694 A1  5/2012   Norair
            (Continued)

FOREIGN PATENT DOCUMENTS

CN    206231168 U    6/2017
CN    109747350 A    5/2019
            (Continued)

OTHER PUBLICATIONS

Extended European Search Report for European Patent Application No. 23207997.0, mailed Mar. 19, 2024, 7 pages.
            (Continued)

*Primary Examiner* — Long T Tran
*Assistant Examiner* — Charles J Brauch
(74) *Attorney, Agent, or Firm* — Withrow & Terranova, PLLC

(57) ABSTRACT

A computer system comprising processing circuitry configured to: receive sensor data of a gas temperature in a vehicle tire; in response to the gas temperature being above a predetermined temperature threshold, control a temperature reduction unit to perform a temperature reduction action for the vehicle tire; receive status data of the temperature reduction action for the vehicle tire, the status data being indicative of the temperature reduction in the vehicle tire relative to the temperature threshold; and perform a vehicle responsive action for avoiding a vehicle tire rupture in response to the status data.

20 Claims, 8 Drawing Sheets

(51) Int. Cl.

| | |
|---|---|
| B60C 23/20 | (2006.01) |
| B60W 10/22 | (2006.01) |
| B60W 10/30 | (2006.01) |
| G07C 5/08 | (2006.01) |

(52) U.S. Cl.
CPC ............ B60W 10/22 (2013.01); B60W 10/30 (2013.01); G07C 5/0816 (2013.01)

(56)     References Cited

U.S. PATENT DOCUMENTS

| | | |
|---|---|---|
| 2014/0039752 A1 | 2/2014 | Juzswik |
| 2015/0239312 A1 | 8/2015 | Abukashef |
| 2016/0229235 A1 | 8/2016 | Saint-Loup et al. |
| 2019/0023089 A1 | 1/2019 | Abdossalami et al. |
| 2020/0047568 A1 | 2/2020 | Alhammadi et al. |
| 2022/0063357 A1 | 3/2022 | Singh et al. |

FOREIGN PATENT DOCUMENTS

| | | | | |
|---|---|---|---|---|
| CN | 116160807 A | * | 5/2023 | ............ B60C 23/18 |
| EP | 2366562 A1 | | 9/2011 | |
| EP | 3042793 A1 | | 7/2016 | |
| FR | 2680135 A1 | | 2/1993 | |
| WO | 2009036547 A1 | | 3/2009 | |

OTHER PUBLICATIONS

Extended European Search Report for European Patent Application No. 23207996.2, mailed Mar. 14, 2024, 42 pages.

* cited by examiner

METHOD FOR REDUCING THE RISK OF VEHICLE TIRE RUPTURE

PRIORITY APPLICATIONS

The present application claims priority to European Patent Application No. 23207996.2, filed on Nov. 6, 2023, and entitled "METHOD FOR REDUCING THE RISK OF VEHICLE TIRE RUPTURE," which is incorporated herein by reference in its entirety.

TECHNICAL FIELD

The disclosure relates generally to vehicle tires. In particular aspects, the disclosure relates to tire rupture prevention in a vehicle tire. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Gas leakage due to a tire rupture of a vehicle tire presents a critical issue that encompasses various ramifications for both the vehicle's performance and safety. The fundamental consequence of such gas leakage is the gradual reduction of tire pressure. This reduction, if left unaddressed, can profoundly affect the vehicle's handling characteristics and operational efficiency.

In addition, gas leakage may negatively affect the rolling resistance of the wheel of the vehicle. In particular, a deflated tire may increase the rolling resistance of the vehicle which in turn increases the fuel consumption for a vehicle propelled by an internal combustion engine, or increases the power consumption for a vehicle propelled by an electric traction motor. In fact, it has been realized that the rolling resistance may affect the efficiency of the vehicle to a larger extent than e.g. the vehicle's aerodynamic properties.

Gas leakage may e.g. occur due to a too high gas pressure in the vehicle tire, or a too high gas temperature in the vehicle tire. In particular, when the gas temperature of the vehicle tire increases fast, the tire rupture may be a sudden tire rupture. However, gas leakage may be avoided, and there is thus a desire to reduce the frequency of gas leakage and to reduce the risk of tire ruptures.

SUMMARY

According to a first aspect of the disclosure, a computer system comprising processing circuitry configured to: receive sensor data of a gas temperature in a vehicle tire; in response to the gas temperature being above a predetermined temperature threshold, control a temperature reduction unit to perform a temperature reduction action for the vehicle tire; receive status data of the temperature reduction action for the vehicle tire, the status data being indicative of the temperature reduction in the vehicle tire relative to the temperature threshold; and perform a vehicle responsive action for avoiding a vehicle tire rupture in response to the status data. The first aspect of the disclosure may seek to overcome problems with tire ruptures, such as flat tires or exploding tires, due to tire fatigue or a too high gas temperature in the vehicle tire, even for scenarios in which the gas temperature in the vehicle tire is reduced to be below the predetermined temperature threshold. A technical benefit may include reduced risk of tire ruptures, such as e.g. future tire ruptures due to tire fatigue and/or sudden tire ruptures due to a too high gas temperature in the vehicle tire. Thus, even though the temperature reduction action may bring down the temperature in the vehicle tire to be below the predetermined temperature threshold, and thereby avoiding a too high gas temperature in the vehicle tire which otherwise could result in tire rupture, or a sudden tire rupture, there may still be a weakness in, or malfunctioning of, the vehicle tire which needs to be resolved in order to avoid a future tire rupture. Thus, by utilizing the status data of the temperature reduction action for the vehicle tire for performing a vehicle responsive action for avoiding a vehicle tire rupture, or future vehicle tire rupture, such weakness in, or malfunctioning of, the vehicle tire may be resolved, or at least partly resolved. The predetermine temperature threshold is typically corresponding to temperature being critically high, or close to being critically high, risking a sudden tire rupture, e.g. 80° C., or 90° C.

Optionally in some examples, including in at least one preferred example, the processing circuitry is configured to receive sensor data of the gas temperature in the vehicle tire prior to the temperature reduction action by the temperature reduction unit, and subsequent to the temperature reduction action of the temperature reduction unit. The processing circuitry may e.g. be configured to continuously receive sensor data of the gas temperature in the vehicle tire. The sensor data of the gas temperature may be transmitted from a gas temperature sensor in the vehicle tire. Optionally in some examples, including in at least one preferred example, the status data is based on, or corresponds to, the gas temperature in the vehicle tire subsequent to the temperature reduction action.

Optionally in some examples, including in at least one preferred example, the processing circuitry is further configured to perform the vehicle responsive action by at least generating data with instructions informing an operator of the vehicle about the temperature reduction action in the vehicle tire and/or of the status data of the temperature reduction action. A technical benefit may include avoiding future vehicle tire ruptures as the operator is aware of the temperature reduction action, and/or the status data of the temperature reduction action. Thus, the operator of the vehicle may adapt the operation of the vehicle accordingly, and e.g. plan maintenance of the vehicle or vehicle tire. For example, the processing circuitry may be configured to transmit the generated data with instructions to an operator display, e.g. a display within the vehicle. The generated data may e.g. comprise data of a maintenance event of the vehicle tire which is displayed on the operator display. According to an example, the processing circuitry may be configured to transmit the generated data with instructions in the form of an alarm message.

Optionally in some examples, including in at least one preferred example, the processing circuitry is further configured to: classify the status data into a successful status in response to that the gas temperature in the vehicle tire subsequent to the temperature reduction action is below the predetermined temperature threshold by at least a first predetermined value, and into a non-successful status in response to that the gas temperature in the vehicle tire subsequent to the temperature reduction action is above the predetermined temperature threshold or below the predetermined temperature threshold by at most a second predetermined value, the second predetermined value being smaller than the first predetermined value; and, in response to the status data being classified as successful status, perform a first vehicle responsive action for avoiding a vehicle tire rupture, and in response to the status data being classified as non-successful status, perform a second vehicle responsive action for avoiding a vehicle tire rupture, the second vehicle responsive action being different to the first vehicle responsive action. A technical benefit may include adapted vehicle responsive action in response of the classified status data. Thus, in response to the status being successful (the status data being classified as successful status), i.e. that the temperature reduction unit managed to reduce the gas temperature in the vehicle tire to be below at least the predetermined temperature threshold by the first predetermined value, a first type of vehicle responsive action for avoiding a vehicle tire rupture is performed by the processing circuitry, e.g. generating data with instructions informing an operator of the vehicle about the successful temperature reduction action in the vehicle tire. Correspondingly, in response to the status being non-successful (the status data being classified as non-successful status), i.e. that the temperature reduction unit did not manage to reduce the gas temperature in the vehicle tire to be below the predetermined temperature threshold, or manage to reduce the gas temperature in the vehicle tire to be below the predetermined temperature threshold by at most the second predetermined value, and not by at least the first predetermined value, a second type of vehicle responsive action for avoiding a vehicle tire rupture is performed by the processing circuitry, e.g. generating data with instructions informing an operator of the vehicle about the non-successful temperature reduction action in the vehicle tire, or even controlling the vehicle to reduce the speed or stop, as will be further described later. The processing circuitry may e.g. be configured to access to look-up tables including the criteria for the classification. For example, the first predetermined value may be 15° C., which means that in case the predetermined temperature threshold is 80° C., the status data is classified as being successful data in response that the gas temperature in the vehicle tire subsequent to the temperature reduction action is below 65° C. Correspondingly, the second predetermined value may be 5° C., which means that in case the predetermined temperature threshold is 80° C., the status data is classified as being non-successful data in response that the gas temperature in the vehicle tire subsequent to the temperature reduction action is above 80° C., or is at most reduced by 5° C. to be at 75° C. or above.

Optionally in some examples, including in at least one preferred example, the processing circuitry is further configured to: classify the status data into an intermediate status in response to that the gas temperature in the vehicle tire subsequent to the temperature reduction action is below the predetermined temperature threshold by a third predetermined value, the third predetermined value being in between the first and second predetermined values, and perform a third vehicle responsive action in response to the status data being classified as intermediate status. A technical benefit may include improved adapted vehicle responsive action in response of the classified status data. Thus, in response to the status being intermediate (the status data being classified as intermediate status), i.e. that the temperature reduction unit managed to reduce the gas temperature in the vehicle tire to be below the predetermined temperature threshold, but not enough for being below by the first predetermined value, and not as poorly as being below the predetermined temperature threshold by at most the second predetermined value, but by reducing the gas temperature in the vehicle tire by something in between the first and second predetermined values, a third type of vehicle responsive action for avoiding a vehicle tire rupture is performed by the processing circuitry. This may e.g. be generating data with instructions informing the operator of the vehicle about the intermediate temperature reduction action in the vehicle tire, or even controlling the vehicle to reduce the speed. For example, in case the first predetermined value is 15° C., the predetermined temperature threshold is 80° C. and the second predetermined value is 5° C., the third predetermined value is between 5° C. and 15° C., which means that if the temperature reduction unit manage to reduce the gas temperature in the vehicle tire to somewhere in between 65° C. and 75° C., the status data is classified as being intermediate data.

Optionally in some examples, including in at least one preferred example, the third vehicle responsive action is at least transmitting data for limiting the speed of the vehicle. A technical benefit may include avoiding future vehicle tire ruptures as limiting the speed of the vehicle typically results in a reduction of the gas temperature in the vehicle tire. Moreover, the processing circuitry may be configured to not transmit data for limiting the speed of the vehicle in response to the status data being classified as successful data. Thus, adaptive measures in response to the status data of the temperature reduction action can be achieved, as the processing circuitry is configured to transmit data for limiting the speed of the vehicle first when the status of the temperature reduction action is an intermediate status. For example, the processing circuitry may be further configured to perform the third vehicle responsive action for avoiding a vehicle tire rupture by at least transmitting data with instruction to a vehicle speed control unit to limit the speed of the vehicle, or by generating data with instructions informing the operator of the vehicle to limit the speed of the vehicle, e.g. via the previously mentioned operator display.

Optionally in some examples, including in at least one preferred example, the second vehicle responsive action is at least transmitting data for stopping the vehicle. A technical benefit may include avoiding future vehicle tire ruptures as stopping the vehicle typically results in a reduction of the gas temperature in the vehicle tire. Moreover, the processing circuitry may be configured to not transmit data for stopping the vehicle in response to the status data being classified as successful data, or intermediate data. Thus, adaptive measures in response to the status data of the temperature reduction action can be achieved, as the processing circuitry is configured to transmit data for stopping the vehicle first when the status of the temperature reduction action is non-successful status. For example, the processing circuitry may be further configured to perform the second vehicle responsive action for avoiding a vehicle tire rupture by at least transmitting data with instruction to a vehicle speed control unit to reduce the speed of the vehicle to zero, or by generating data with instructions informing the operator of the vehicle to stop the vehicle, e.g. via the previously mentioned operator display. As a further alternative, the processing circuitry may be configured to transmit data with instruction to a control unit handling emergency stops to stop the vehicle. The stopping of the vehicle may e.g. be associated with stopping the vehicle within a predetermined stop time, or at an upcoming safe place to stop.

Optionally in some examples, including in at least one preferred example, the processing circuitry is further configured to perform the temperature reduction action by controlling a wheel suspension for the vehicle tire to reduce the load of the vehicle tire relative to a road which the vehicle is travelling on, to thereby reduce the temperature of the vehicle tire. A technical benefit may include an efficient way to reduce the temperature of the vehicle tire. The wheel suspension may be coupled to the vehicle suspension arrangement configured to control the wheel suspension for a plurality of wheels and associated tires of the vehicle. The processing circuitry may be configured to control the vehicle suspension arranged to reduce the load of the vehicle tire (subject to the temperature reduction action) relative to the road at the expense of increasing the load relative to the road of at least another tire of the vehicle. Hereby, at least a sudden tire rupture of the vehicle tire (subject to the temperature reduction action) may be achieved. The processing circuitry may be configured to transmit data to the wheel suspension or vehicle suspension arrangement with instructions to reduce the load of the vehicle tire relative to a road which the vehicle is travelling on. Thus, the temperature reduction unit may be the wheel suspension of the vehicle tire.

Optionally in some examples, including in at least one preferred example, the processing circuitry is further configured to perform the temperature reduction action by controlling a central tire inflation unit to control the gas pressure of the vehicle tire to thereby reduce the temperature of the vehicle tire. A technical benefit may include an efficient way to reduce the temperature of the vehicle tire. For example, in case the gas pressure in the vehicle tire is reduced (e.g. by being below a predetermined gas pressure threshold), but may be not reduced enough to trigger a low tire pressure warning, the friction between the vehicle tire and the road may increase causing the gas temperature in the vehicle tire to increase, e.g. above the predetermined temperature threshold. Thus, by increasing the gas pressure in the vehicle tire by the central tire inflation unit, the friction between the vehicle tire and the road may be decreased with a resulting decrease in the gas temperature in the vehicle tire. The processing circuitry may be configured to transmit data to the central inflation unit with instructions to increase or decrease the gas pressure in the vehicle tire. Thus, the temperature reduction unit may be the central tire inflation unit for the vehicle tire. The central tire inflation unit may be configured to increase or decrease the gas pressure in the vehicle tire.

Optionally in some examples, including in at least one preferred example, the processing circuitry is further configured to perform the temperature reduction action by controlling an air convection unit to direct a stream of cooling air to the outside of the vehicle tire. A technical benefit may include an efficient way to reduce the temperature of the vehicle tire. The air convection unit may e.g. be arranged in the vehicle to direct a stream of cooling air to the outside of the vehicle tire, and the processing circuitry may be configured to activate and deactivate the air convention unit, e.g. by controlling a valve in, or upstream of, the air convection unit. The air convection unit may be fluidly coupled to the AC-system of the vehicle, and may thus be configured to direct a stream of AC-controlled air to the outside of the vehicle tire. The processing circuitry may be configured to transmit data to the air convection unit with instructions to direct a stream of cooling air to the outside of the vehicle tire, e.g. by operating a valve as previously described. Thus, the temperature reduction unit may be the air convection unit for the vehicle tire.

Optionally in some examples, including in at least one preferred example, the processing circuitry is further configured to perform the temperature reduction action by controlling a water treatment device to direct a spray of cooling water to the outside of the vehicle tire. A technical benefit may include an efficient way to reduce the temperature of the vehicle tire. The water treatment device may e.g.

be arranged in the vehicle to direct a spray of cooling water to the outside of the vehicle tire, and the processing circuitry may be configured to activate and deactivate the water treatment device, e.g. by controlling a valve in, or upstream of, the water treatment device. The water treatment device may be coupled to the AC-system of the vehicle, and may be configured to use the condensate of the AC-system as the cooling water, and thus to direct a spray of AC-condensate water to the outside of the vehicle tire. The processing circuitry may be configured to transmit data to the water treatment device with instructions to direct a spray of cooling water to the outside of the vehicle tire, e.g. by operating a valve as previously described. Thus, the temperature reduction unit may be the water treatment device for the vehicle tire.

Optionally in some examples, including in at least one preferred example, the temperature reduction unit is at least one of the previously mentioned examples. For example, the temperature reduction unit is at least one of the wheel suspension of the vehicle tire, the central tire inflation unit of the vehicle tire, the air convection unit for the vehicle tire, and the water treatment device for the vehicle tire. It should be understood that the temperature reduction action by the temperature reduction unit is typically performed as the vehicle is travelling, and the vehicle tire is moving along the road which the vehicle is travelling on. It should be noted that the status data of the temperature reduction action may be combined with sensor data of the gas pressure in the vehicle tire. Thus, the vehicle responsive action for avoiding a vehicle tire rupture may be performed in response to the status data and the sensor data of the gas pressure in the vehicle tire. For example, if the gas pressure in the vehicle tire is above a predetermined gas pressure threshold, the processing circuitry may be further configured to perform the vehicle responsive action by also generating data with instructions informing an operator of the vehicle about the gas pressure in the vehicle tire. The predetermine gas pressure threshold is typically corresponding to gas pressure being critically high, or close to being critically high, risking a sudden tire rupture. However, it should be noted that the gas temperature may, at least temporarily, rise above the predetermined temperature threshold, with the increased risk of a sudden tire rupture (e.g. an exploding tire), without the gas pressuring of the vehicle tire being above the predetermined gas pressure threshold.

According to a second aspect of the disclosure, a vehicle comprising the computer system of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure. The vehicle may e.g. comprise a temperature sensor arranged in a vehicle tire, the temperature sensor being configured to measure the temperature in the vehicle tire and to send sensor data of the gas temperature to the processing circuitry of the computer system.

According to a third aspect of the disclosure, a computer-implemented method is provided. The method comprises: determining, by processing circuitry of a computer system, a gas temperature in a vehicle tire; controlling, by the processing circuitry, a temperature reduction unit to perform a temperature reduction action for the vehicle tire in response to the gas temperature being above a predetermined temperature threshold; determining, by the processing circuitry, the status of the temperature reduction action for the vehicle tire, the status being indicative of the temperature reduction in the vehicle tire relative to the temperature threshold; and performing, by the processing circuitry, a vehicle responsive action for avoiding a vehicle tire rupture in response to the determined status.

The third aspect of the disclosure may seek to solve the same problem as described for the first aspect of the disclosure. Thus, effects and features of the third aspect of the disclosure are largely analogous to those described above in connection with the first aspect of the disclosure, and is not repeated here again. The processing circuitry is e.g. that of the first aspect of the disclosure.

Optionally in some examples, including in at least one preferred example, the method further comprises: performing, by the processing circuitry, the vehicle responsive action by at least generating data with instructions informing an operator of the vehicle about the temperature reduction action in the vehicle tire and/or of the status data of the temperature reduction action.

Optionally in some examples, including in at least one preferred example, the method further comprises: determining, by the processing circuitry, the status as a successful status in response to that the gas temperature in the vehicle tire subsequent to the temperature reduction action is below the predetermined temperature threshold by at least a first predetermined value, and as a non-successful status in response to that the gas temperature in the vehicle tire subsequent to the temperature reduction action is above the predetermined temperature threshold or below the predetermined temperature threshold by at most a second predetermined value, the second predetermined value being smaller than the first predetermined value; and performing, by the processing circuitry, a first vehicle responsive action for avoiding a vehicle tire rupture in response to determining the status as successful status, and performing, by the processing circuitry, a second vehicle responsive action for avoiding a vehicle tire rupture in response to determining the status as non-successful status.

Optionally in some examples, including in at least one preferred example, the method further comprises: determining, by the processing circuitry, the status as an intermediate status in response to that the gas temperature in the vehicle tire subsequent to the temperature reduction action is below the predetermined temperature threshold by a third predetermined value, the third predetermined value being in between the first and second predetermined values; and performing, by the processing circuitry, a third vehicle responsive action for avoiding a vehicle tire rupture in response to determining the status as intermediate status.

Optionally in some examples, including in at least one preferred example, the third vehicle responsive action at least includes limiting the speed of the vehicle. Thus, the method may comprise controlling the speed of the vehicle in response to determining the status as intermediate status.

Optionally in some examples, including in at least one preferred example, the second vehicle responsive action at least includes stopping the vehicle. Thus, the method may comprise controlling stopping of the vehicle in response to determining the status as non-successful status.

Optionally in some examples, including in at least one preferred example, the method further comprises: performing, by the processing circuitry, the temperature reduction action by controlling at least one of the following: a wheel suspension for the vehicle tire to reduce the load of the vehicle tire relative to a road which the vehicle is travelling on, to thereby reduce the temperature of the vehicle tire; a central tire inflation unit to control the gas pressure of the vehicle tire to thereby reduce the temperature of the vehicle tire; an air convection unit to direct a stream of cooling air to the outside of the vehicle tire; a water treatment device to direct a spray of cooling water to the outside of the vehicle tire.

According to a fourth aspect of the disclosure, a computer program product comprising program code for performing, when executed by the processing circuitry, the method of the third aspect of the disclosure is provided. The processing circuitry is e.g. that of the first aspect of the disclosure.

According to a fifth aspect of the disclosure, a non-transitory computer-readable storage medium comprising instructions, which when executed by the processing circuitry, cause the processing circuitry to perform the method of the third aspect of the disclosure is provided. The processing circuitry is e.g. that of the first aspect of the disclosure.

The fourth to fifth aspects of the disclosure may seek to solve the same problem as described for the first aspect of the disclosure. Thus, effects and features of the fourth to fifth aspects of the disclosure are largely analogous to those described above in connection with the first aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

The disclosed technology may solve problems related to tire ruptures, such as flat tires or exploding tires, due to tire fatigue or a too high gas temperature in the vehicle tire. For scenarios in which the gas temperature in the vehicle tire is actively reduced to be below the predetermined temperature threshold, typically a temperature for which a sudden tire rupture is deemed to be likely, future, or near-future, tire ruptures due to tire fatigue and/or other malfunctioning in the vehicle tire may still occur. Thus, a gas temperature in the vehicle tire which at least temporarily is above the predetermined temperature threshold may be an important indication that imminent maintenance of the vehicle or of the vehicle tire is needed. Thus, even though the temperature reduction action may bring down the temperature in the vehicle tire to be below the predetermined temperature threshold, and thereby avoiding a too high gas temperature in the vehicle tire which otherwise could result in tire rupture, or a sudden tire rupture, there may still be a weakness in, or malfunctioning of, the vehicle tire which needs to be resolved in order to avoid a future tire rupture. Thus, by the disclosed technology, a reduced risk of at least future, or near-future, tire ruptures is provided.

Figure 1:
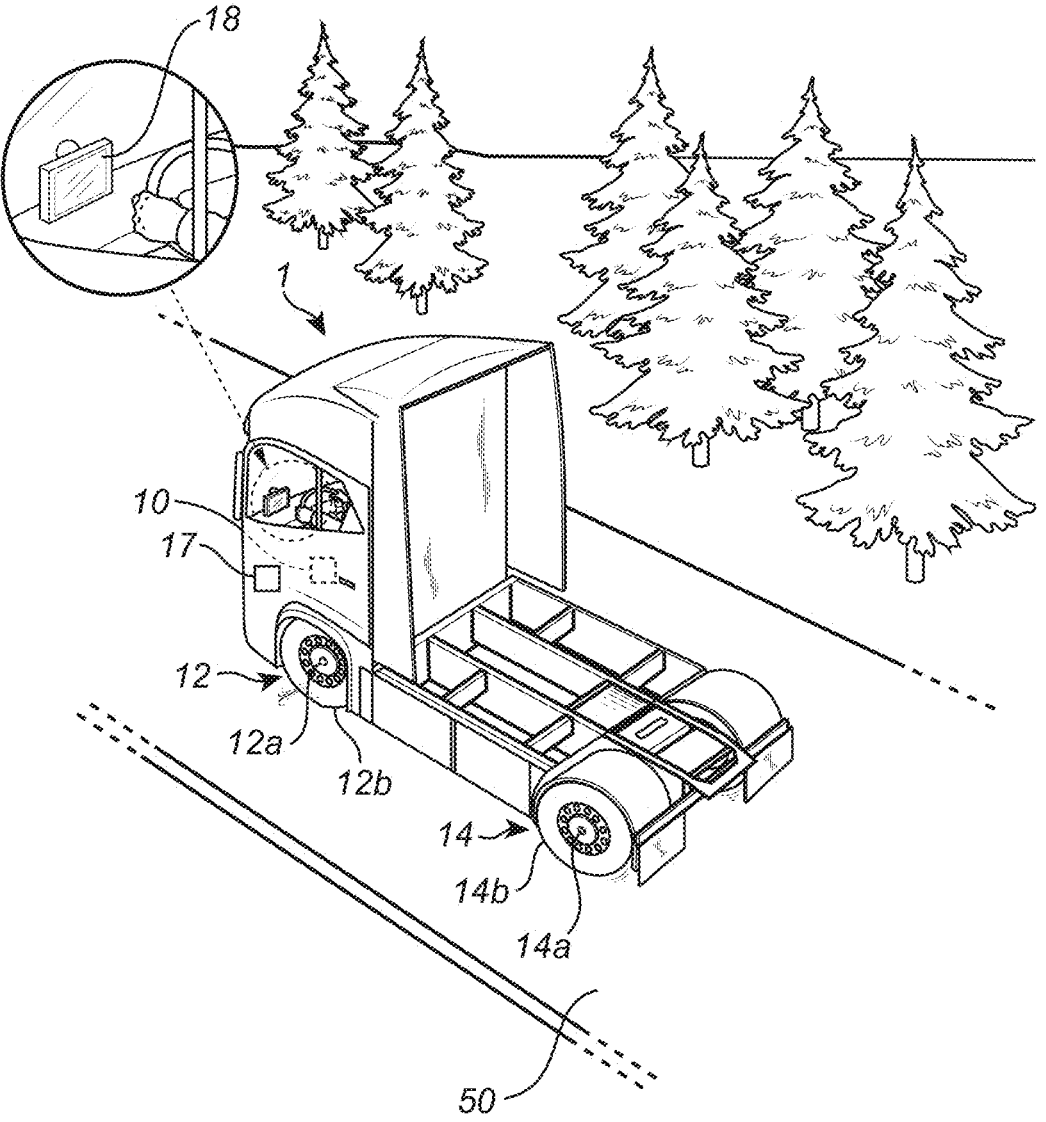
FIG. 1 is an exemplary illustration of a vehicle according to an example.

FIG. 1 shows a vehicle 1 in the form of an exemplary heavy duty truck. The vehicle 1 comprises an engine or motor 10 which may be combustion engine, e.g. an internal combustion engine, or an electric machine for propelling the vehicle 1. The electric machine is typically powered by electricity supplied from at least one energy storage or transformation device, e.g. a battery or a fuel cell, and the combustion engine is typically powered by fuel, such as gaseous fuel, e.g. hydrogen, or liquid fuel, e.g. diesel, stored in a fuel tank (not shown). However, the vehicle 1 may also be a hybrid vehicle, comprising at least one electric machine (as an electric traction machine) and a combustion engine. The engine or motor 10 is coupled to other parts of the powertrain of the vehicle 1, such as transmission, drive shafts and wheels 12, 14. In FIG. 1, two of the wheels 12, 14 are shown, a front wheel 12 of a pair of front wheels, and a back wheel 14 of a pair of back wheels. Each one of the front wheel 12 and back wheel 14 comprises a corresponding wheel hub 12a, 14a and an encompassing vehicle tire 12b, 14b. The vehicle tires 12b, 14b are typically filled with pressurized gas to reduce the rolling resistance between the wheels 12, 14 and the road 50 which the vehicle 1 is travelling on. As shown in FIG. 1, the vehicle tire 12b may be subject to a tire rupture leading to flat tire, e.g. due to tire fatigue or a too high gas temperature in the vehicle tire 12b.

In FIG. 1, the vehicle 1 is a towing vehicle and may alternatively comprise two pair of rear wheels. Also, the vehicle 1 may be a truck provided with one or more trailer units connected to the towing vehicle. Also, a dolly may be arranged between e.g. the towing vehicle and the trailer unit. The vehicle may also comprise one or more liftable wheel axles, where the wheels of such axle can be lifted above ground level during operation. Accordingly, when in the following describing a tire rupture of a vehicle tire, it should be readily understood that this can occur for any one of, or each one of, the vehicle tires provided to the particular type of vehicle, e.g. the vehicle tire(s) of the towing vehicle, the dolly and/or the trailer. Thus, the herein exemplified system including any associated components to the vehicle tire configured to reduce the risk of a tire rupture may be associated with any one of, or each one of, the vehicle tires provided to the particular type of vehicle.

The vehicle 1 comprises a processing circuitry 17, typically comprised in a computer system or a controlling unit of the vehicle 1. The processing circuitry 17 is configured to control at least some of the operation of the vehicle 1, as will be described in the following.

Figure 2:
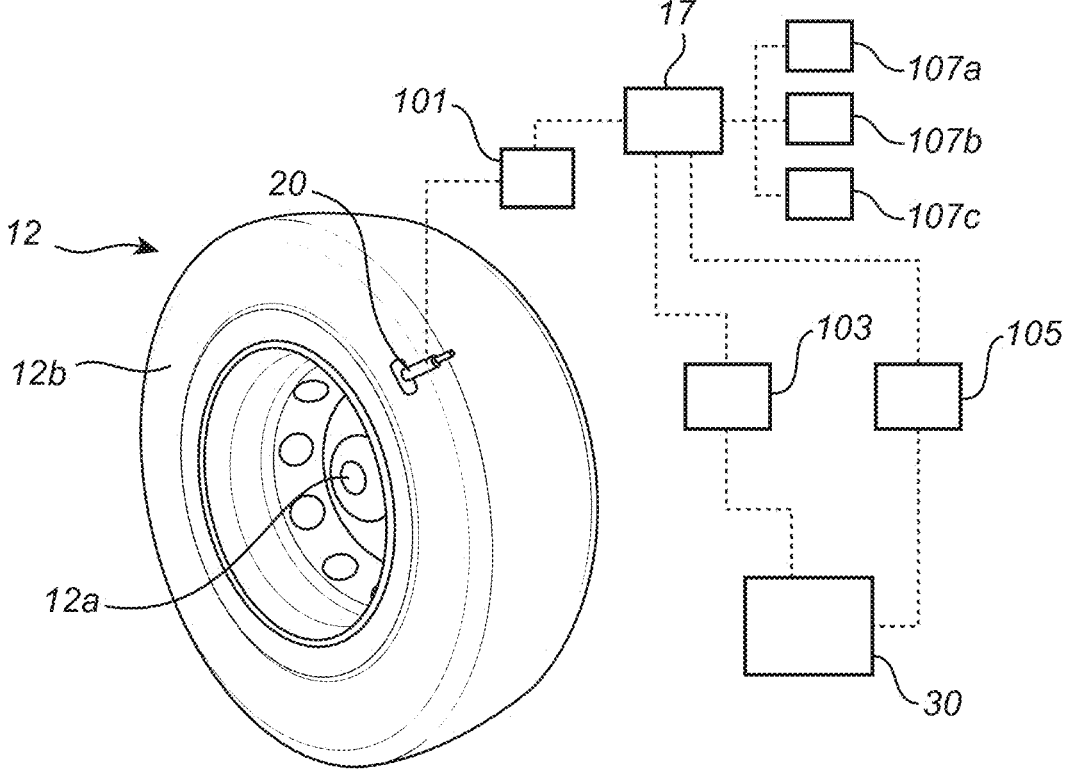
FIG. 2 is an exemplary illustration of a vehicle tire according to an example.

In FIG. 2, the front wheel 12 of FIG. 1 is shown in greater detail (prior to a rupture of the vehicle tire 12b). The front wheel 12 comprises a temperature sensor 20 arranged in the vehicle tire 12b and being configured to measure the temperature in the vehicle tire 12b and to send sensor data 101 of the gas temperature to the processing circuitry 17. However, the gas temperature of the vehicle tire 12b may be determined by other means than the temperature sensor 20, e.g. by estimations using the gas pressure in the vehicle tire 12b. Thus, the front wheel 12 may comprise a pressure sensor (not shown) as an alternative, or in addition, to the temperature sensor 20.

The processing circuitry 17 is configured to receive the sensor data 101 of the gas temperature of the vehicle tire 12b, and in response to the gas temperature being above a predetermined temperature threshold, control a temperature reduction unit 30 to perform a temperature reduction action for the vehicle tire 12b. Hereby, a tire rupture due to a too high gas temperature in the vehicle tire 12b can be avoided, as the gas temperature in the vehicle tire 12b can be reduced by the temperature reduction action. Thus, the processing circuitry 17 may be configured to compare the gas temperature of the sensor data 101 with the predetermined temperature threshold, and determine whether or not the gas temperature of the sensor data 101 is above the predetermined temperature threshold. In case it is determined that the gas temperature of the sensor data 101 is above the predetermined temperature threshold, the processing circuitry 17 may transmit data 103 with instructions to the temperature reduction unit 30, and thereby control the temperature reduction unit 30 to perform the temperature reduction action.

The processing circuitry 17 is further configured to receive status data 105 of the temperature reduction action for the vehicle tire 12b. The status data 105 is indicative of the temperature reduction in the vehicle tire 12b relative to the temperature threshold. That is, the status data 105 is indicative of the success of the temperature reduction action performed by the temperature reduction unit 30.

The processing circuitry 17 is further configured to perform a vehicle responsive action for avoiding a vehicle tire rupture in response to the status data 105. The vehicle responsive action may e.g. include generating data 107a, 107b, 107c with instructions informing an operator of the vehicle 1 about the temperature reduction action in the vehicle tire 12b and/or of the status data 105 of the temperature reduction action. For example, the processing circuitry 17 may be configured to transmit the generated data 107a, 107b, 107c with instructions to an operator display 18 arranged in the vehicle 1 (shown in FIG. 1). The generated data 107a, 107b, 107c may e.g. comprise data of suggested maintenance of the vehicle tire 12b which is displayed on the operator display 18. Thus, future vehicle tire ruptures may be avoided as the operator of the vehicle 1 becomes aware of the temperature reduction action, and/or the status data 105 of the temperature reduction action. Thus, the operator of the vehicle 1 may adapt the operation of the vehicle 1 accordingly, and e.g. plan maintenance of the vehicle 1 or vehicle tire 12b.

The processing circuitry 17 may be configured to classify the status data 105. For example, the processing circuitry 17 may classify the status data 105 as successful status in response to that the gas temperature in the vehicle tire 12b subsequent to the temperature reduction action is below the predetermined temperature threshold by at least a first predetermined value. That is, the status of the temperature reduction action is classified as successful in response to that the gas temperature in the vehicle tire 12b is brought to be below the predetermined temperature threshold by at least the first predetermined value. For example, the status data 105 may be based on sensor data from the temperature sensor 20 comprising the gas temperature of the vehicle tire 12b subsequent to the temperature reduction action. Moreover, the processing circuitry 17 may classify the status data 105 as non-successful status in response to that the gas temperature in the vehicle tire 12b subsequent to the temperature reduction action is above the predetermined temperature threshold, or is below the predetermined temperature threshold by at most a second predetermined value, the second predetermined value being smaller than the first predetermined value. That is, the status of the temperature reduction action is classified as non-successful in response to that the gas temperature in the vehicle tire 12*b* cannot be brought to be below the predetermined temperature threshold, or at least cannot be brought to be below the predetermined temperature threshold by more than the second predetermined value. Again, the status data 105 may be based on sensor data from the temperature sensor 20 comprising the gas temperature of the vehicle tire 12*b* subsequent to the temperature reduction action. Moreover, the processing circuitry 17 may classify the status data 105 as intermediate status in response to that the gas temperature in the vehicle tire 12*b* subsequent to the temperature reduction action is below the predetermined temperature threshold by a third predetermined value, the third predetermined value being in between the first and second predetermined values. That is, the status of the temperature reduction action is classified as intermediate in response to that the gas temperature in the vehicle tire 12*b* is brought to be below the predetermined temperature threshold by least the second predetermined value, but not more than the first predetermined value. Again, the status data 105 may be based on sensor data from the temperature sensor 20 comprising the gas temperature of the vehicle tire 12*b* subsequent to the temperature reduction action. Thus, the status data 105 may correspond to the gas temperature in the vehicle tire 12*b* subsequent to the temperature reduction action.

The processing circuitry 17 may be configured perform different vehicle responsive actions in response to the classified status data 105. For example, in response to the status data being classified as successful status, the processing circuitry 17 may be configured to perform a first vehicle responsive action for avoiding a vehicle tire rupture, and in response to the status data being classified as non-successful status, the processing circuitry 17 may be configured to perform a second vehicle responsive action for avoiding a vehicle tire rupture, the second vehicle responsive action being different to the first vehicle responsive action. Hereby, the vehicle responsive action may be adapted in response of the classified status data. Moreover, for examples in which the status data is classified as intermediate status, the processing circuitry 17 may be configured to perform a third vehicle responsive action for avoiding a vehicle tire rupture, the third vehicle responsive action being different to at least one of the first and second vehicle responsive actions.

For example, in response to the status being successful (i.e. the status data being classified as successful status), the processing circuitry 17 may generate a first set of data 107*a* with instructions informing the operator of the vehicle 1 about the successful temperature reduction action in the vehicle tire 12*b*. Thus, even though the temperature reduction action has brought down the gas temperature in the vehicle tire 12*b* to be below the predetermined temperature threshold by the first predetermined value, and thereby avoiding a too high gas temperature in the vehicle tire 12*b* which otherwise could result in a sudden tire rupture (e.g. a tire explosion), there may still be a weakness in, or malfunctioning of, the vehicle tire 12*b* which needs to be resolved in order to avoid a future tire ruptures, and which by the first vehicle responsive action and the first set of generated data 107*a* is made aware to the operator of the vehicle 1. Of course, instead of transmitting the first set of generated data 107*a* to the operator the vehicle 1, the data

107*a* may be sent to a control unit of the vehicle, e.g. for automatically planning maintenance of the vehicle tire 12*b*.

Additionally or alternatively, in response to the status being non-successful (i.e. the status data being classified as non-successful status), the processing circuitry 17 may generate a second set of data 107*b* with instructions informing the operator of the vehicle 1 about the non-successful temperature reduction action in the vehicle tire 12*b*, or with instructions to automatically control the vehicle 1 to reduce the speed of the vehicle 1 or stop the vehicle 1. Thus, as the temperature reduction action did not manage to reduce the gas temperature in the vehicle tire 12*b* to be below the predetermined temperature threshold, or to only reduce the gas temperature in the vehicle tire 12*b* to be below the predetermined temperature threshold by at most the second predetermined value, the gas temperature in the vehicle tire 12*b* may be deemed to be too high with a high risk of a sudden tire rupture. In response to this, the processing circuitry 17 may transmit the second set of generated data 107*b* informing the operator of the vehicle 1 to stop the vehicle 1, or for automatically stopping the vehicle 1. Hereby, future vehicle tire ruptures may be avoided as stopping the vehicle 1 typically results in a reduction of the gas temperature in the vehicle tire 12*b*, and thereby a reduced risk of a vehicle tire rupture. For example, the processing circuitry 17 may be configured to transmit the second set of generated data 107*b* to a vehicle speed control unit to reduce the speed of the vehicle to zero, or to a control unit handling emergency stops to stop the vehicle 1. The stopping of the vehicle 1 may e.g. be associated with stopping the vehicle 1 within a predetermined stop time, or at an upcoming, potentially predefined, safe place to stop along the road 50.

Additionally or alternatively, in response to the status being intermediate (i.e. the status data being classified as intermediate status), the processing circuitry 17 may generate a third set of data 107*c* with instructions informing the operator of the vehicle 1 about the intermediate temperature reduction action in the vehicle tire 12*b*, or with instructions to automatically control the vehicle 1 to reduce the speed of the vehicle 1. Thus, as the temperature reduction action did not manage to reduce the gas temperature in the vehicle tire 12*b* to be below the predetermined temperature threshold by the first predetermined value, but only by the third predetermined value, the gas temperature in the vehicle tire 12*b* may be deemed to be at a dangerous level (at least if being kept at such temperature for too long) with an increased risk of a sudden, or future, tire rupture. In response to this, the processing circuitry 17 may transmit the third set of generated data 107*c* informing the operator of the vehicle 1 to reduce the speed of the vehicle 1, or for automatically limiting the speed of the vehicle 1. Hereby, future vehicle tire ruptures may be avoided as reducing the speed of the vehicle 1 typically results in a reduction of the gas temperature in the vehicle tire 12*b*, and thereby a reduced risk of a vehicle tire rupture. For example, the processing circuitry 17 may be configured to transmit the third set of generated data 107*c* to a vehicle speed control unit to limit the maximum speed of the vehicle 1.

According to one example, the first vehicle responsive action is transmitting the first set of data 107*a* with instructions informing the operator of the vehicle 1 about the successful temperature reduction action in the vehicle tire 12*b*, the second vehicle responsive action is transmitting the second set of data 107*b* with instructions to automatically control the vehicle 1 to stop the vehicle 1, and the third vehicle responsive action is transmitting the third set of data 107c with instructions to automatically control the vehicle 1 to reduce the speed of the vehicle 1.

The processing circuitry 17 may e.g. be configured to access look-up tables including the criteria for the classification, and the vehicle responsive action to be performed in response to the classified status data.

Turning to FIGS. 3A, 3B, 3C and 3D, showing various temperature reduction units 30a, 30b, 30c, 30d for performing the temperature reduction action of the vehicle tire 12b.

Figure 3A:
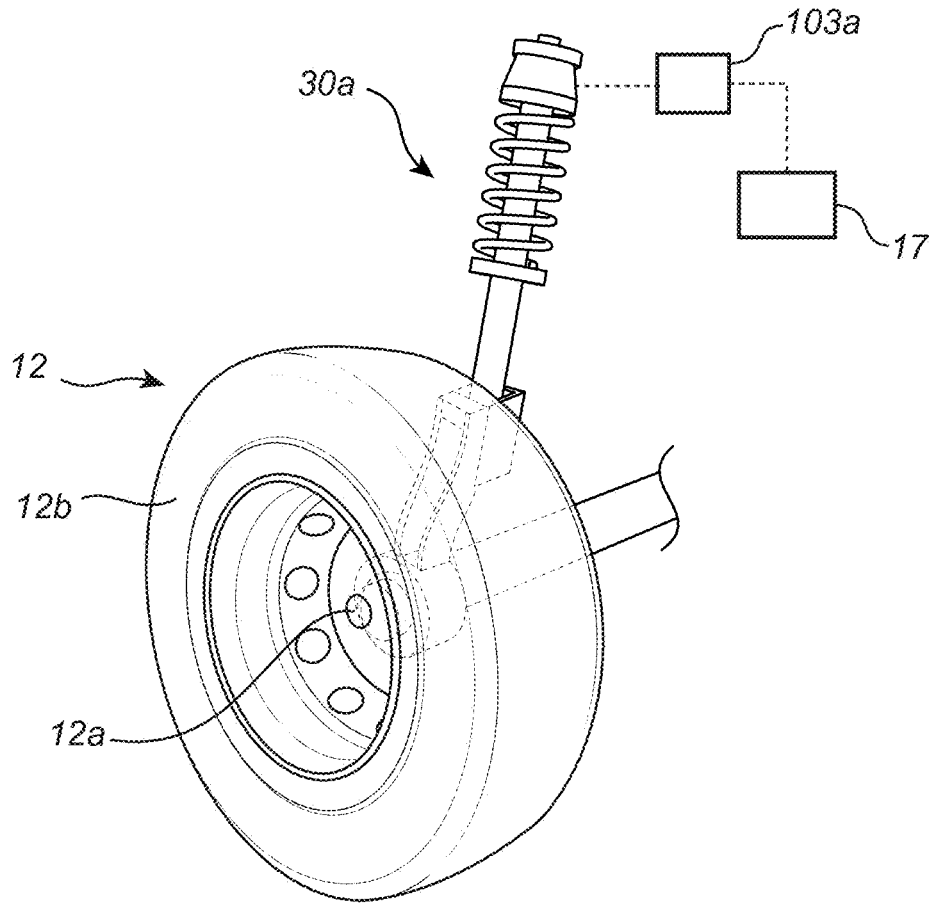
FIGS. 3A, 3B, 3C and 3D are exemplary illustrations of vehicle tires according to various examples.

In FIG. 3A, a wheel suspension 30a for the front wheel 12 is shown. The wheel suspension 30a is configured to adapt the suspension of the front wheel 12 and to thereby adapt the load of the vehicle tire 12b relative to the road 50. The wheel suspension 30a may be coupled to a vehicle suspension arrangement configured to control the wheel suspension for at least another wheel of the vehicle, such as e.g. the back wheel 14.

The processing circuitry 17 may be configured to perform the temperature reduction action by controlling the wheel suspension 30a to reduce the load of the vehicle tire 12b relative to the road 50, to thereby reduce the temperature of the vehicle tire 12b. This may be achieved by transmitting data 103a with instructions to the wheel suspension 30a to reduce the load of the vehicle tire 12b relative to the road 50. Thus, the temperature reduction unit performing the temperature reduction action may be the wheel suspension 30a of the vehicle tire 12b. The processing circuitry 17 may be configured to control the vehicle suspension 12b to reduce the load of the vehicle tire 12b relative to the road 50 at the expense of increasing the load relative to the road 50 of at least another tire of the vehicle 1, such as the vehicle tire 14b of the back wheel 14b.

Figure 3B:
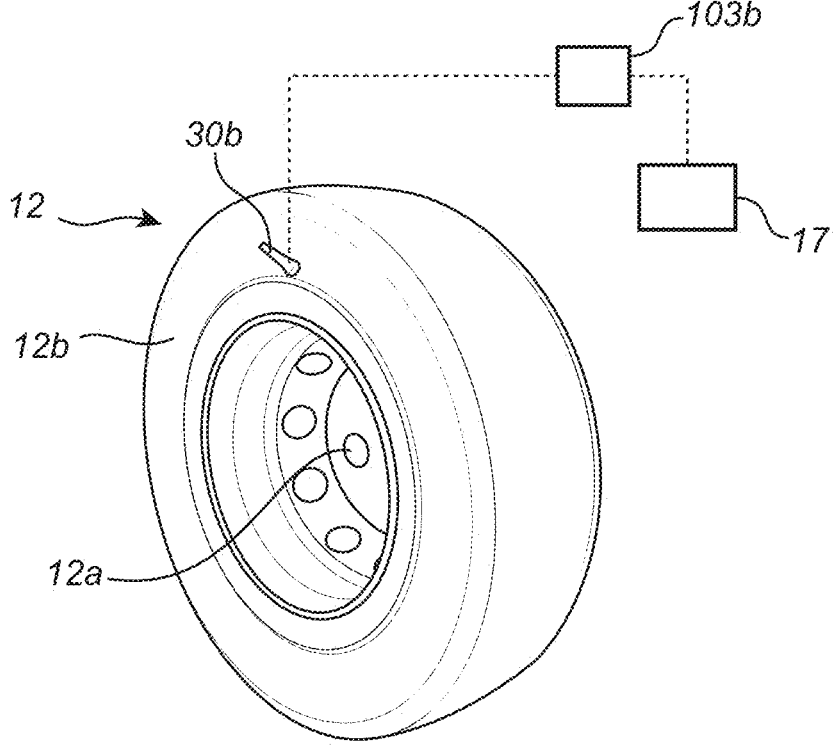

In FIG. 3B, a central tire inflation unit 30b for the front wheel 12 is shown. The central tire inflation unit 30b is configured to control the gas pressure of the vehicle tire 12b to thereby reduce the temperature of the vehicle tire. The central tire inflation unit 30b may be configured to increase or decrease the gas pressure in the vehicle tire 12b.

The processing circuitry 17 may be configured to perform the temperature reduction action by controlling the central tire inflation unit 30b to control the gas pressure of the vehicle tire 12b to thereby reduce the temperature of the vehicle tire 12b. This may e.g. be achieved by transmitting data 103b with instructions to the central tire inflation unit 30b to increase the gas pressure of the vehicle tire 12b. Thus, the temperature reduction unit performing the temperature reduction action may be the central tire inflation unit 30b of the vehicle 1.

Figure 3C:
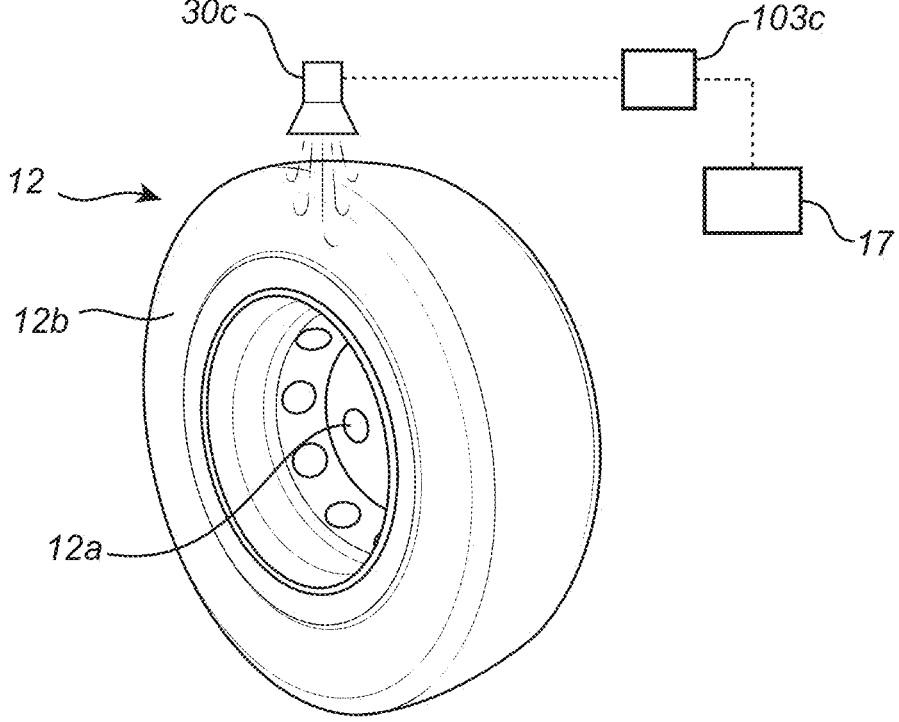

In FIG. 3C, an air convection unit 30c for the front wheel 12 is shown. The air convection unit 30c is configured to direct a stream of cooling air to the outside of the vehicle tire 12b. The air convection unit 30c may be fluidly coupled to the AC-system of the vehicle 1, and may thus be configured to direct a stream of AC-controlled air to the outside of the vehicle tire 12b.

The processing circuitry 17 may be configured to perform the temperature reduction action by controlling the air convection unit 30c to direct a stream of cooling air to the outside of the vehicle tire 12b to thereby reduce the temperature of the vehicle tire 12b. This may be achieved by transmitting data 103c with instructions to the air convection unit 30c to activate the air convection unit 30c, e.g. by operating a valve controlling the stream of cooling air out of the air convection unit 30c. Thus, the temperature reduction unit performing the temperature reduction action may be the air convection unit 30c for the vehicle tire 12b.

Figure 3D:
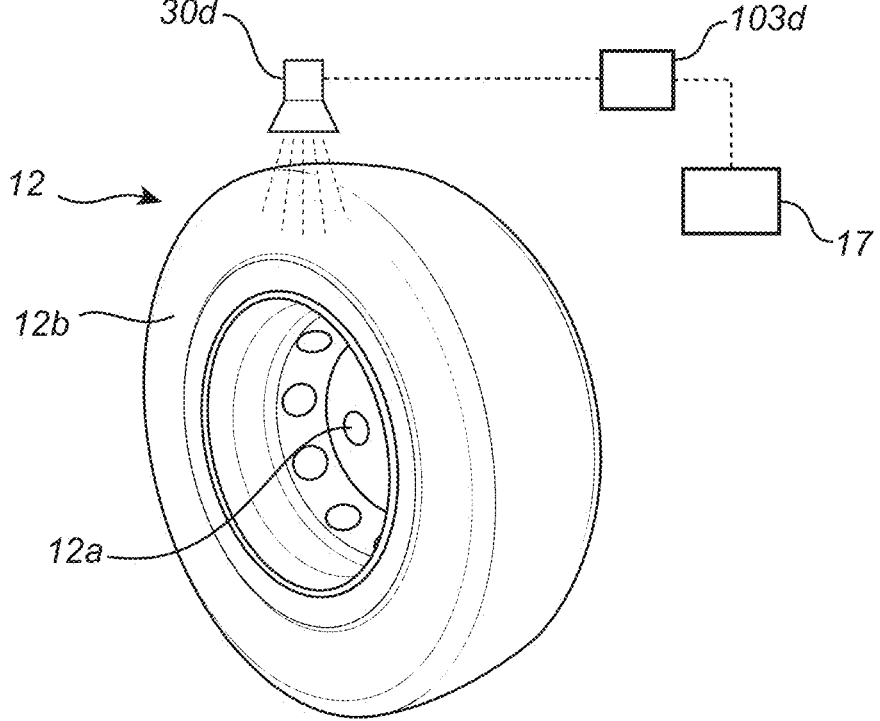

In FIG. 3D, a water treatment device 30d for the front wheel 12 is shown. The water treatment device 30d is configured to direct a spray of cooling water to the outside of the vehicle tire 12b. The water treatment device 30d may be fluidly coupled to the AC-system of the vehicle 1, and may thus be configured to direct a spray of AC-condensate water to the outside of the vehicle tire 12b.

The processing circuitry 17 may be configured to perform the temperature reduction action by controlling the water treatment device 30d to direct a spray of cooling water to the outside of the vehicle tire 12b to thereby reduce the temperature of the vehicle tire 12b. This may be achieved by transmitting data 103d with instructions to the water treatment device 30d to activate the water treatment device 30d, e.g. by operating a valve controlling the spray of cooling water out of water treatment device 30d. Thus, the temperature reduction unit performing the temperature reduction action may be the water treatment device 30d for the vehicle tire 12b.

Figure 4:
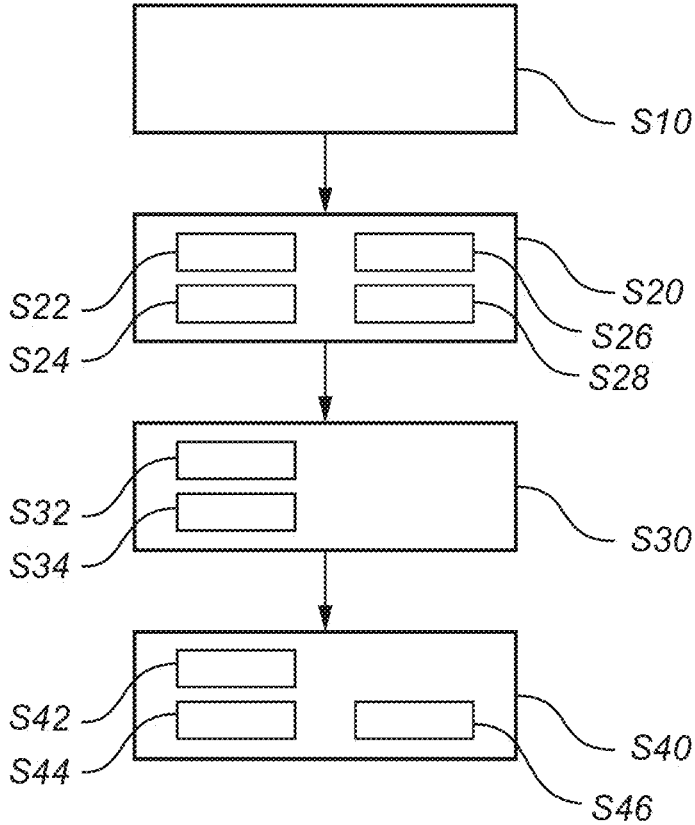
FIG. 4 is a flow chart of a method according to an example.

FIG. 4 is a flow chart of a computer-implemented method for reducing the risk of, or even avoiding, a vehicle tire rupture. The method may be implemented by controlling the temperature reduction unit 30, 30a, 30b, 30c, 30d previously described. Thus, reference is further made to features described in FIGS. 1-3D in the following.

In a first action or step, S10, a gas temperature in a vehicle tire 12b is determined by a processing circuitry 17 of a computer system. The first action or step S10 may comprise receiving, by the processor circuitry 17, sensor data 101 of the temperature sensor 20 described with reference to FIG. 2.

In a second action or step S20, a temperature reduction unit 30 is controlled, by the processing circuitry 17, to perform a temperature reduction action for the vehicle tire 12b in response to the gas temperature being above a predetermined temperature threshold. The temperature reduction unit 30 may be any of the temperature reduction units 30a, 30b, 30c, 30d described with reference to FIGS. 3A-3D. Thus, in a first optional sub-step or sub-action S22 to the second action or step S20, the temperature reduction action is performed by controlling, by the processing circuitry 17, a wheel suspension 30a for the vehicle tire 12b to reduce the load of the vehicle tire 12b relative to the road 50 which the vehicle 1 is travelling on, to thereby reduce the temperature of the vehicle tire 12b. In a second optional sub-step or sub-action S24 to the second action or step S20, the temperature reduction action is performed by controlling, by the processing circuitry 17, a central tire inflation unit 30b to control the gas pressure of the vehicle tire 12b to thereby reduce the temperature of the vehicle tire 12b. In a third optional sub-step or sub-action S26 to the second action or step S20, the temperature reduction action is performed by controlling, by the processing circuitry 17, an air convection unit 30c to direct a stream of cooling air to the outside of the vehicle tire 12b to thereby reduce the temperature of the vehicle tire 12b. In a fourth optional sub-step or sub-action S28 to the second action or step S20, the temperature reduction action is performed by controlling, by the processing circuitry 17, a water treatment device 30d to direct a spray of cooling water to the outside of the vehicle tire 12b to thereby reduce the temperature of the vehicle tire 12b. The first to fourth sub-steps or sub-actions S22, S24, S26, S28 may also be combined in various combinations.

In a third action or step S30, the status of the temperature reduction action for the vehicle tire 12b is determined by the processing circuitry 17, the status being indicative of the temperature reduction in the vehicle tire 12b relative to the temperature threshold. In a first optional sub-step or sub-action S32 to the third action or step S30, the status is determined, by the processing circuitry 17 as a successful status in response to that the gas temperature in the vehicle tire 12*b* subsequent to the temperature reduction action is below the predetermined temperature threshold by at least a first predetermined value, and as a non-successful status in response to that the gas temperature in the vehicle tire 12*b* subsequent to the temperature reduction action is above the predetermined temperature threshold or below the predetermined temperature threshold by at most a second predetermined value, the second predetermined value being smaller than the first predetermined value. In a second optional sub-step or sub-action S34 to the third action or step S30, the status is determined, by the processing circuitry 17, as an intermediate status in response to that the gas temperature in the vehicle tire subsequent to the temperature reduction action is below the predetermined temperature threshold by a third predetermined value, the third predetermined value being in between the first and second predetermined values.

In a fourth action or step S40, a vehicle responsive action for avoiding a vehicle tire rupture is performed, by the processing circuitry 17, in response to the determined status. In a first optional sub-step or sub-action S42 to the fourth action or step S40, the vehicle responsive action is performed, by the processing circuitry 17, by at least generating data with instructions informing an operator of the vehicle about the temperature reduction action in the vehicle tire and/or of the status data of the temperature reduction action. In a second optional sub-step or sub-action S44 to the fourth action or step S40, a first vehicle responsive action for avoiding a vehicle tire rupture is performed, by the processing circuitry 17, in response to determining the status as successful status, and a second vehicle responsive action for avoiding a vehicle tire rupture is performed, by the processing circuitry 17, in response to determining the status as non-successful status. In a third optional sub-step or sub-action S46 to the fourth action or step S40, a third vehicle responsive action for avoiding a vehicle tire rupture is performed, by the processing circuitry 17, in response to determining the status as intermediate status. All of the first, second and third vehicle responsive actions may be different to each other. For example, the first vehicle responsive action may include informing, by the processing circuitry 17, the operator of the vehicle 1 about the successful temperature reduction action, the second vehicle responsive action may include stopping the vehicle 1, and/or the third vehicle responsive action may include limiting the speed of the vehicle. Any one of the second and third optional sub-steps or sub actions S44, S46 may be combined with the first optional sub-step of sub-action S42.

Even though the method of FIG. 4 is described with reference to the front wheel 12 of the vehicle 1, the related features (structural and functional) may be implemented for any one of, or all of, the other wheels of the vehicle, such as e.g. the back wheel 14, or a wheel of a trailer or dolly.

Figure 5:
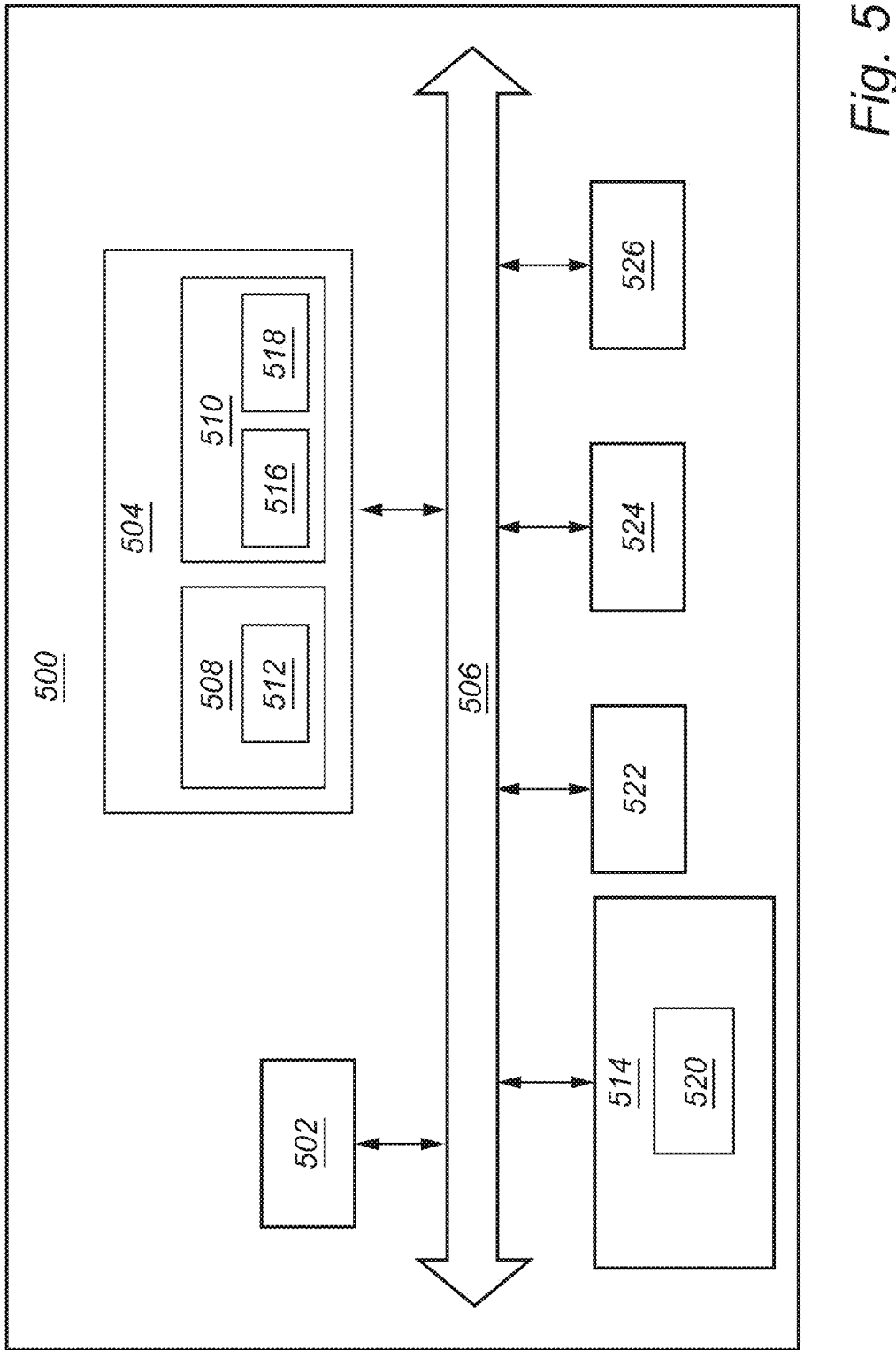
FIG. 5 is a schematic diagram of an exemplary computer system for implementing examples disclosed herein, according to an example.

FIG. 5 is a schematic diagram of a computer system 500 for implementing examples disclosed herein. The computer system 500 is adapted to execute instructions from a computer-readable medium to perform these and/or any of the functions or processing described herein, e.g. the method as described with reference to FIG. 4. The computer system 500 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include processing circuitry 502 (e.g., processing circuitry including one or more processor devices or control units), a memory 504, and a system bus 506. The computer system 500 may include at least one computing device having the processing circuitry 502. The system bus 506 provides an interface for system components including, but not limited to, the memory 504 and the processing circuitry 502. The processing circuitry 502 may include any number of hardware components for conducting data or signal processing or for executing computer code stored in memory 504. The processing circuitry 502 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 502 may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out actions described herein. Thus, the computer-readable program code of the computer program 520 can comprise software instructions for implementing the functionality of the examples described herein when executed by the processing circuitry 502. In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502. The processing circuitry 502 may serve as a controller or control system for the computer system 500 that is to implement the functionality described herein.

The computer system 500 may include an input device interface 522 configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces, such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

EXAMPLE LIST

Example 1

A computer system comprising processing circuitry configured to: receive sensor data of a gas temperature in a vehicle tire; in response to the gas temperature being above a predetermined temperature threshold, control a temperature reduction unit to perform a temperature reduction action for the vehicle tire; receive status data of the temperature reduction action for the vehicle tire, the status data being indicative of the temperature reduction in the vehicle tire relative to the temperature threshold; and perform a vehicle responsive action for avoiding a vehicle tire rupture in response to the status data.

Example 2

The computer system of example 1, the processing circuitry is further configured to perform the vehicle responsive action by at least generating data with instructions informing an operator of the vehicle about the temperature reduction action in the vehicle tire and/or of the status data of the temperature reduction action.

Example 3

The computer system of any of examples 1-2, wherein the processing circuitry is further configured to: classify the status data into a successful status in response to that the gas temperature in the vehicle tire subsequent to the temperature reduction action is below the predetermined temperature threshold by at least a first predetermined value, and into a non-successful status in response to that the gas temperature in the vehicle tire subsequent to the temperature reduction action is above the predetermined temperature threshold or below the predetermined temperature threshold by at most a second predetermined value, the second predetermined value being smaller than the first predetermined value; in response to the status data being classified as successful status, perform a first vehicle responsive action for avoiding a vehicle tire rupture, and in response to the status data being classified as non-successful status, perform a second vehicle responsive action for avoiding a vehicle tire rupture, the second vehicle responsive action being different to the first vehicle responsive action

Example 4

The computer system of example 3, wherein the processing circuitry is further configured to: classify the status data into an intermediate status in response to that the gas temperature in the vehicle tire subsequent to the temperature reduction action is below the predetermined temperature threshold by a third predetermined value, the third predetermined value being in between the first and second predetermined values; and perform a third vehicle responsive action for avoiding a vehicle tire rupture in response to the status data being classified as intermediate status.

Example 5

The computer system of example 4, wherein the third vehicle responsive action is at least transmitting data for limiting the speed of the vehicle.

Example 6

The computer system of any of examples 3-5, wherein the second vehicle responsive action is at least transmitting data for stopping the vehicle.

Example 7

The computer system of any of examples 1-6, wherein the processing circuitry is further configured to perform the temperature reduction action by controlling a wheel suspension for the vehicle tire to reduce the load of the vehicle tire relative to a road which the vehicle is travelling on, to thereby reduce the temperature of the vehicle tire.

Example 8

The computer system of any of examples 1-7, wherein the processing circuitry is further configured to perform the temperature reduction action by controlling a central tire inflation unit to control the gas pressure of the vehicle tire to thereby reduce the temperature of the vehicle tire.

Example 9

The computer system of any of examples 1-8, wherein the processing circuitry is further configured to perform the temperature reduction action by controlling an air convection unit to direct a stream of cooling air to the outside of the vehicle tire.

Example 10

The computer system of any of examples 1-9, wherein the processing circuitry is further configured to perform the temperature reduction action by controlling a water treatment device to direct a spray of cooling water to the outside of the vehicle tire.

Example 11

A vehicle comprising the computer system of any of examples 1-10.

Example 12

A computer-implemented method is provided. The method comprises: determining, by processing circuitry of a computer system, a gas temperature in a vehicle tire; controlling, by the processing circuitry, a temperature reduction unit to perform a temperature reduction action for the vehicle tire in response to the gas temperature being above a predetermined temperature threshold; determining, by the processing circuitry, the status of the temperature reduction action for the vehicle tire, the status being indicative of the temperature reduction in the vehicle tire relative to the temperature threshold; and performing, by the processing circuitry, a vehicle responsive action for avoiding a vehicle tire rupture in response to the determined status.

Example 13

The method of example 12, further comprising: performing, by the processing circuitry, the vehicle responsive action by at least generating data with instructions informing an operator of the vehicle about the temperature reduction action in the vehicle tire and/or of the status data of the temperature reduction action.

Example 14

The method of any of examples 12-3, further comprising: determining, by the processing circuitry, the status as a successful status in response to that the gas temperature in the vehicle tire subsequent to the temperature reduction action is below the predetermined temperature threshold by at least a first predetermined value, and as a non-successful status in response to that the gas temperature in the vehicle tire subsequent to the temperature reduction action is above the predetermined temperature threshold or below the predetermined temperature threshold by at most a second predetermined value, the second predetermined value being smaller than the first predetermined value; and performing, by the processing circuitry, a first vehicle responsive action for avoiding a vehicle tire rupture in response to determining the status as successful status, and performing, by the processing circuitry, a second vehicle responsive action for avoiding a vehicle tire rupture in response to determining the status as non-successful status.

Example 15

The method of example 14, further comprising: determining, by the processing circuitry, the status as an intermediate status in response to that the gas temperature in the vehicle tire subsequent to the temperature reduction action is below the predetermined temperature threshold by a third predetermined value, the third predetermined value being in between the first and second predetermined values; and performing, by the processing circuitry, a third vehicle responsive action for avoiding a vehicle tire rupture in response to determining the status as intermediate status.

Example 16

The method of example 15, wherein the third vehicle responsive action at least includes limiting the speed of the vehicle.

Example 17

The method of any of examples 14-16, wherein the second vehicle responsive action at least includes stopping the vehicle.

Examples 18. The method of any of examples 12-16, further comprising: performing, by the processing circuitry, the temperature reduction action by controlling at least one of the following: a wheel suspension for the vehicle tire to reduce the load of the vehicle tire relative to a road which the vehicle is travelling on, to thereby reduce the temperature of the vehicle tire; a central tire inflation unit to control the gas pressure of the vehicle tire to thereby reduce the temperature of the vehicle tire; an air convection unit to direct a stream of cooling air to the outside of the vehicle tire; a water treatment device to direct a spray of cooling water to the outside of the vehicle tire.

Example 19

A computer program product comprising program code for performing, when executed by the processing circuitry, the method of any of examples 12-18.

Example 20

A non-transitory computer-readable storage medium comprising instructions, which when executed by the processing circuitry, cause the processing circuitry to perform the method of any of examples 12-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

receive sensor data of a gas temperature in a vehicle tire;

in response to the gas temperature being above a predetermined temperature threshold, control a temperature reduction unit to perform a temperature reduction action for the vehicle tire;

receive status data of the temperature reduction action for the vehicle tire, the status data being indicative of the temperature reduction in the vehicle tire relative to the temperature threshold; and perform a vehicle responsive action for avoiding a vehicle tire rupture in response to the status data.

2. The computer system of claim 1, wherein the processing circuitry is further configured to perform the vehicle responsive action by at least generating data with instructions informing an operator of the vehicle about the temperature reduction action in the vehicle tire and/or of the status data of the temperature reduction action.

3. The computer system of claim 1, wherein the processing circuitry is further configured to:

classify the status data into a successful status in response to that the gas temperature in the vehicle tire subsequent to the temperature reduction action is below the predetermined temperature threshold by at least a first predetermined value, and into a non-successful status in response to that the gas temperature in the vehicle tire subsequent to the temperature reduction action is above the predetermined temperature threshold or below the predetermined temperature threshold by at most a second predetermined value, the second predetermined value being smaller than the first predetermined value; and in response to the status data being classified as successful status, perform a first vehicle responsive action for avoiding a vehicle tire rupture, and in response to the status data being classified as non-successful status, perform a second vehicle responsive action for avoiding a vehicle tire rupture, the second vehicle responsive action being different to the first vehicle responsive action.

4. The computer system of claim 3, wherein the processing circuitry is further configured to:

classify the status data into an intermediate status in response to that the gas temperature in the vehicle tire subsequent to the temperature reduction action is below the predetermined temperature threshold by a third predetermined value, the third predetermined value being in between the first and second predetermined values; and perform a third vehicle responsive action for avoiding a vehicle tire rupture in response to the status data being classified as intermediate status.

5. The computer system of claim 4, wherein the third vehicle responsive action is at least transmitting data for limiting the speed of the vehicle.

6. The computer system of claim 3, wherein the second vehicle responsive action is at least transmitting data for stopping the vehicle.

7. The computer system of claim 1, wherein the processing circuitry is further configured to perform the temperature reduction action by controlling a wheel suspension for the vehicle tire to reduce the load of the vehicle tire relative to a road which the vehicle is travelling on, to thereby reduce the temperature of the vehicle tire.

8. The computer system of claim 1, wherein the processing circuitry is further configured to perform the temperature reduction action by controlling a central tire inflation unit to control the gas pressure of the vehicle tire to thereby reduce the temperature of the vehicle tire.

9. The computer system of claim 1, wherein the processing circuitry is further configured to perform the temperature reduction action by controlling an air convection unit to direct a stream of cooling air to the outside of the vehicle tire.

10. The computer system of claim 1, wherein the processing circuitry is further configured to perform the temperature reduction action by controlling a water treatment device to direct a spray of cooling water to the outside of the vehicle tire.

11. A vehicle comprising the computer system of claim 1.

12. A computer-implemented method, comprising:

determining, by processing circuitry of a computer system, a gas temperature in a vehicle tire;

controlling, by the processing circuitry, a temperature reduction unit to perform a temperature reduction action for the vehicle tire in response to the gas temperature being above a predetermined temperature threshold;

determining, by the processing circuitry, the status of the temperature reduction action for the vehicle tire, the status being indicative of the temperature reduction in the vehicle tire relative to the temperature threshold; and performing, by the processing circuitry, a vehicle responsive action for avoiding a vehicle tire rupture in response to the determined status.

13. The method of claim 12, further comprising:

performing, by the processing circuitry, the vehicle responsive action by at least generating data with instructions informing an operator of the vehicle about the temperature reduction action in the vehicle tire and/or of the status data of the temperature reduction action.

14. The method of claim 12, further comprising:

determining, by the processing circuitry, the status as a successful status in response to that the gas temperature in the vehicle tire subsequent to the temperature reduction action is below the predetermined temperature threshold by at least a first predetermined value, and as a non-successful status in response to that the gas temperature in the vehicle tire subsequent to the temperature reduction action is above the predetermined temperature threshold or below the predetermined temperature threshold by at most a second predetermined value, the second predetermined value being smaller than the first predetermined value; and performing, by the processing circuitry, a first vehicle responsive action for avoiding a vehicle tire rupture in response to determining the status as successful status, and performing, by the processing circuitry, a second vehicle responsive action for avoiding a vehicle tire rupture in response to determining the status as non-successful status.

15. The method of claim 14, further comprising:

determining, by the processing circuitry, the status as an intermediate status in response to that the gas temperature in the vehicle tire subsequent to the temperature reduction action is below the predetermined temperature threshold by a third predetermined value, the third predetermined value being in between the first and second predetermined values; and performing, by the processing circuitry, a third vehicle responsive action for avoiding a vehicle tire rupture in response to determining the status as intermediate status.

16. The method of claim 15, wherein the third vehicle responsive action at least includes limiting the speed of the vehicle.

17. The method of claim 14, wherein the second vehicle responsive action at least includes stopping the vehicle.

18. The method of claim 12, further comprising:

performing, by the processing circuitry, the temperature reduction action by controlling at least one of the following:

a wheel suspension for the vehicle tire to reduce the load of the vehicle tire relative to a road which the vehicle is travelling on, to thereby reduce the temperature of the vehicle tire;

a central tire inflation unit to control the gas pressure of the vehicle tire to thereby reduce the temperature of the vehicle tire;

an air convection unit to direct a stream of cooling air to the outside of the vehicle tire; and a water treatment device to direct a spray of cooling water to the outside of the vehicle tire.

19. A computer program product comprising program code for performing, when executed by the processing circuitry, the method of claim 12.

20. A non-transitory computer-readable storage medium comprising instructions, which when executed by the processing circuitry, cause the processing circuitry to perform the method of claim 12.

* * * * *